United States Patent [19]

Nakano

[11] Patent Number: 5,048,359
[45] Date of Patent: Sep. 17, 1991

[54] TOROIDAL CONTINUOUSLY VARIABLE TRANSMISSION

[75] Inventor: Masaki Nakano, Kawasaki, Japan

[73] Assignee: Nissan Motor Co., Ltd., Yokohama, Japan

[21] Appl. No.: 570,277

[22] Filed: Aug. 15, 1990

[30] Foreign Application Priority Data

Aug. 15, 1989 [JP] Japan .................... 1-210486

[51] Int. Cl.[5] ............................................. F16H 15/00
[52] U.S. Cl. ....................................... 74/190.5; 74/200
[58] Field of Search ................................. 74/190.5, 200

[56] References Cited

U.S. PATENT DOCUMENTS

| 1,986,264 | 1/1935 | Hayes | 74/200 |
|---|---|---|---|
| 2,076,560 | 4/1937 | Hayes | 74/200 |
| 2,850,911 | 9/1958 | Kraus | 74/190.5 |
| 3,142,189 | 7/1964 | Davis et al. | 74/200 |
| 3,413,864 | 12/1968 | Magill et al. | 74/200 |
| 3,430,504 | 3/1969 | Dickenbrock | 74/200 |
| 4,905,529 | 3/1990 | Nakano | 74/201 |
| 4,960,004 | 10/1990 | Hibi et al. | 74/190.5 X |

FOREIGN PATENT DOCUMENTS 0207184 1/1987 European Pat. Off. .
1234119 2/1967 Fed. Rep. of Germany .
62-283256 12/1987 Japan .

OTHER PUBLICATIONS

"Report of Traction Drive Research P-SC62", issued Mar. 1980 by the Japan Mechanical Society.

Primary Examiner—Allan D. Herrmann
Assistant Examiner—David W. Laub
Attorney, Agent, or Firm—Foley & Lardner

[57] ABSTRACT

A toroidal continuously variable transmission, comprises three circumferentially-spaced friction rollers disposed between and in driving contact with input and output toric discs, and roller carriers rotatably supporting the rollers, repectively. Swing links are rotatably supported by a housing. Each of the swing links having two arms associated with the adjacent two of the carriers. A spherical ring received in a bore of each of the arms is coupled to its associated roller carrier for forming a swivel connection between the arm and the associated carrier. A needle bearing is disposed between the spherical ring and the associated roller carrier for forming a slidable connection between the arm and the associated carrier.

8 Claims, 5 Drawing Sheets

TOROIDAL CONTINUOUSLY VARIABLE TRANSMISSION

BACKGROUND OF THE INVENTION

The present invention relates to a toroidal continuously variable transmission.

Recently, the use of toroidal continuously variable transmissions as motor vehicle transmission has been highlighted again owing to development of traction oil with a high traction factor.

The toroidal continuously variable transmissions may be divided into two kinds, one being referred to as a full toroidal continuously variable transmission, the other a half toroidal continuously variable transmission.

The full toroidal continuously variable transmissions include input and output discs having facing toric surfaces of a ½ circular arc, and a plurality of friction rollers disposed between and in driving contact with the toric surfaces for transmitting torque between the input and output discs. These toric surfaces are called as a full toroidal surface. Owing to the full toroidal surfaces, reactions applied to the friction rollers during the transmission of torque between the input and output discs are cancelled. No thurst bearings are needed for supporting the friction rollers, resulting in a simple and durable structure. However, there is a spin loss (a slip loss) during transmission of torque by the friction rollers, and the input and output discs are subject to a considerable inertia of rotation since their radially outermost portions are thick. Taking these two factors into account, the full toroidal continuously variable transmissions are less promising as motor vehicle transmissions.

The half toroidal continuously variable transmissions include input and output discs having facing toric surfaces of a ¼ circular arc, and a plurality of friction rollers disposed between and in driving contact with the toric surfaces. These toric surfaces are called as a half toroidal surface. Since they have less thick radially outermost portions, the input and output disc are subject to less inertia of rotation. Besides, the spin loss in the half toroidal continuously variable transmissions is small. Thus, the half toroidal consinuously variable transmissions are promising as motor vehicle transmissions.

JP-A 62-283256 (Japanese patent application nonexamined publication) discloses a half toroidal continuously variable transmission including two friction rollers disposed between and in driving contact with half toroidal surfaces of input and output discs. Similar troidal continuously variable transmission is disclosed in U.S. Pat. No. 4,905,529 issued to Applicant of the present application on Mar. 6, 1990. This patent claims priority on Japanese patent application Ser. No. 61-275197 which was published as JP-A 63-130954 on June 3, 1988. The known transmission mentioned above cannot meet growing demand for high power output since the two friction rollers can not bear load. For reducing load beared by each of friction rollers, it is advantageous to increase the number of friction rollers.

U.S. Pat. No. 3,142,189 issued to M. Davis et al. discloses a half toroidal continuously variable transmission including three circumferentially-spaced friction rollers disposed between and in driving contact with facing half toroidal surfaces of co-axial input and output discs.

U.S. Pat. No. 3,430,504 discloses a full toroidal continuously variable transmission including two friction roller units, each unit including three circumferentially-spaced friction rollers disposed between facing full toroidal surfaces of coaxial input and output discs.

Recent study of a full toroidal continuously variable transmission with three friction rollers is reported on page 40 of a publication entitled "Report of Traction Drive Research P-SC62" issued on March, 1980 by the Japan Mechanical Society. A ratio control system of this transmission shown in FIGS. 3–37 on page 4 of the above-mentioned publication is illustrated in FIG. 5 of this specification.

Referring to FIG. 5, the transmission comprises circumferentially-spaced friction rollers 1 rotatably supported by three roller carriers 2 called as hubs. Three Y-shaped swing links 3 called as rockers are rotatably supported on a spider 6 grounded to a housing. A control sleeve 7 is rotatably supported on an input shaft. Each of the Y-shaped links 3 has a leg operatively connected to the control sleeve 7 to form a pivotal connection, and first and second arms connected to adjacent two roller carriers. Each of the roller carriers is associated with two Y-shaped links and has one end connected to a first arm of one of the associated Y-shaped links to form a ball joint 4 and an opposite end connected to a second arm of the other associated Y-shaped link 3 to form a joint 5. A change to a desired ratio is initiated by rotating the control sleeve 7 through a small angle. This rotation causes the Y-shaped swing links 3 to swing, tilting the roller carriers 2 through an angle $\theta$. This causes a skew (a side slip) to occur between the rollers 2 and those input and output discs which the rollers are disposed between and in driving contact with, causing the rollers to incline relative to the input and oyutput discs.

The above-mentioned full toroidal continuously variable transmission with three friction rollers has the same problems as pointed out before in connection with the full toroidal continuously variable transmission. Thus, it suffers from the before-mentioned spin loss and inertia of rotation of input and output discs. Besides, it is necessary to machine the joint 5 with a high degree of precision in order to position each of the roller carriers with good accuracy.

An object of the present invention is to provide a toroidal continuously variable transmission wherein roller carriers are positioned with good accuracy without any high degree of precision in machining.

Further object of the present invention is to provide a toroidal continuously variable transmission of the above kind which meets a demand for high power output with a spin loss and inertia of rotation of input and output discs restrained.

SUMMARY OF THE INVENTION

A toroidal continuously variable transmission according to the present invention comprises:

a housing;

co-axial input and output discs having facing toric surfaces;

at least three circumferentially-spaced friction rollers disposed between and in driving contact with said toric surfaces for transmitting torque between said input and output discs;

roller carrriers rotatably supporting said rollers, respectively;

swing links rotatably supported by said housing, each of said swing links having two arms associated with the adjacent two of said carriers;

means for forming a swivel connection between each of said arms and its associated carrier;

means for forming a slidable connection between each of said arms and its associated carrier; and control means for controlling said roller carriers.

According to specific aspect of the present invention, each of the toric surfaces of the input and output disc is a half toroid.

According to further aspect of the present invention the control means include servo motors operatively connected to said roller carriers, respectively; a source of hydraluic fluid; pump means for drawing in the hydraulic fluid from said source of hydraulic fluid and generating the hydraulic fluid at a pressure; control valve means for controlling a pressure differential created within each of said servo motors for inducing motion of its associated roller carrier; means including an actuator for activating said control valve means; and feedback means for appling a force to said control valve means in response to said motion of one of said roller carriers.

DETAILED DESCRIPTION OF THE INVENTION

Figure 1:
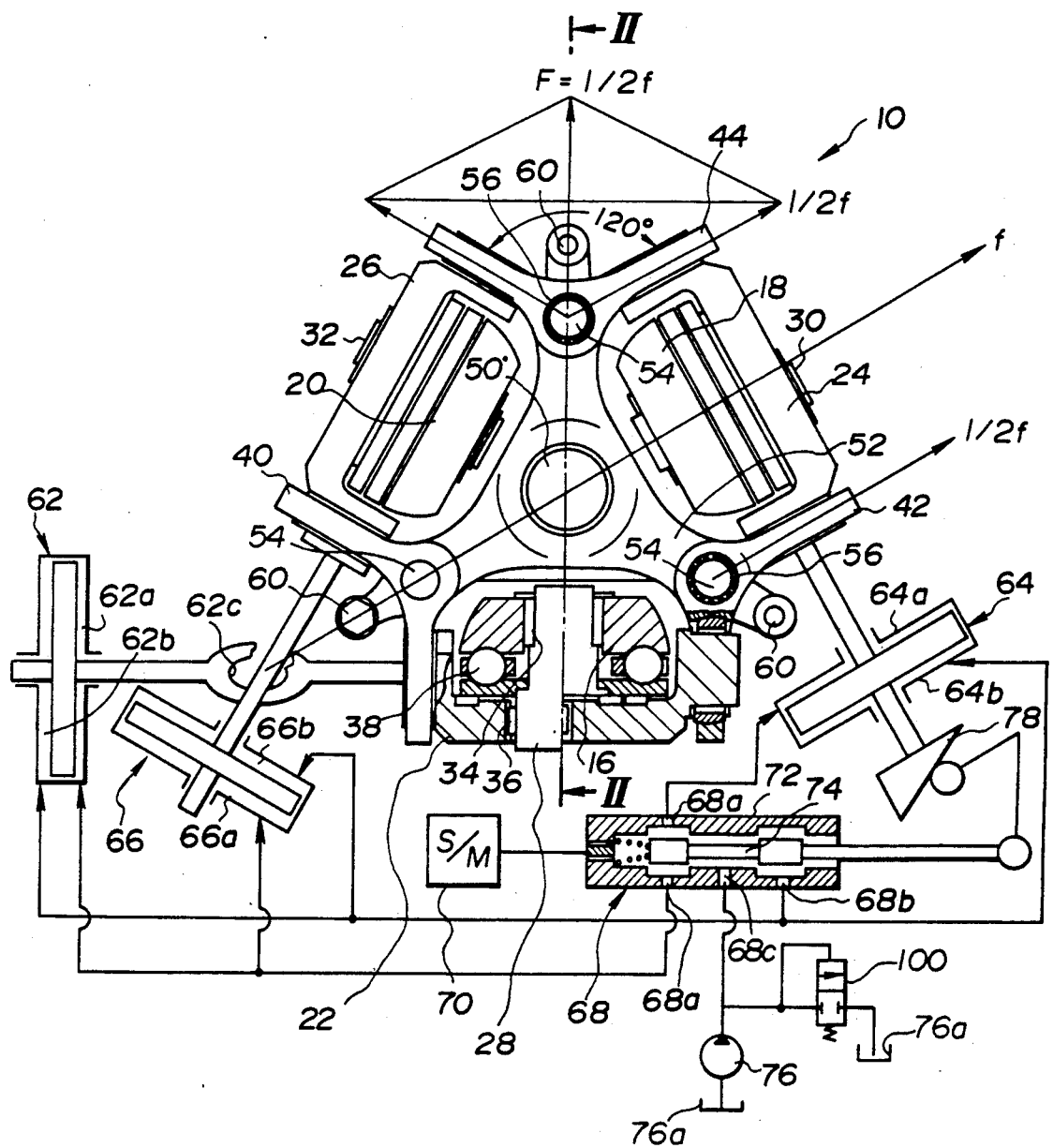
FIG. 1 is a sectional diagrammatic view of a toroidal continuously variable transmission.
Figure 2:
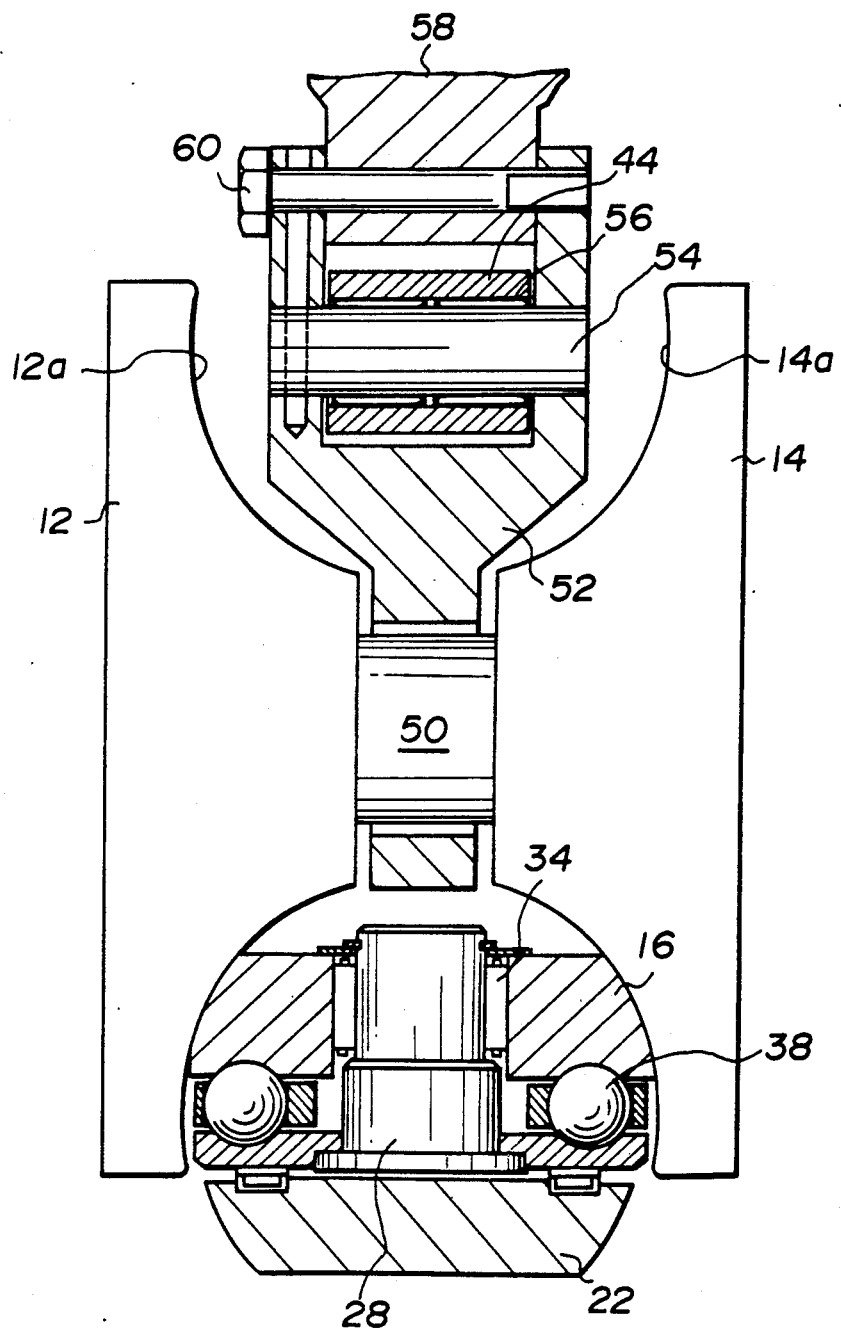
FIG. 2 is a longitudinal sectional diagrammatic view taken along the line II—II of the transmission shown in FIG. 1.
Figure 3:
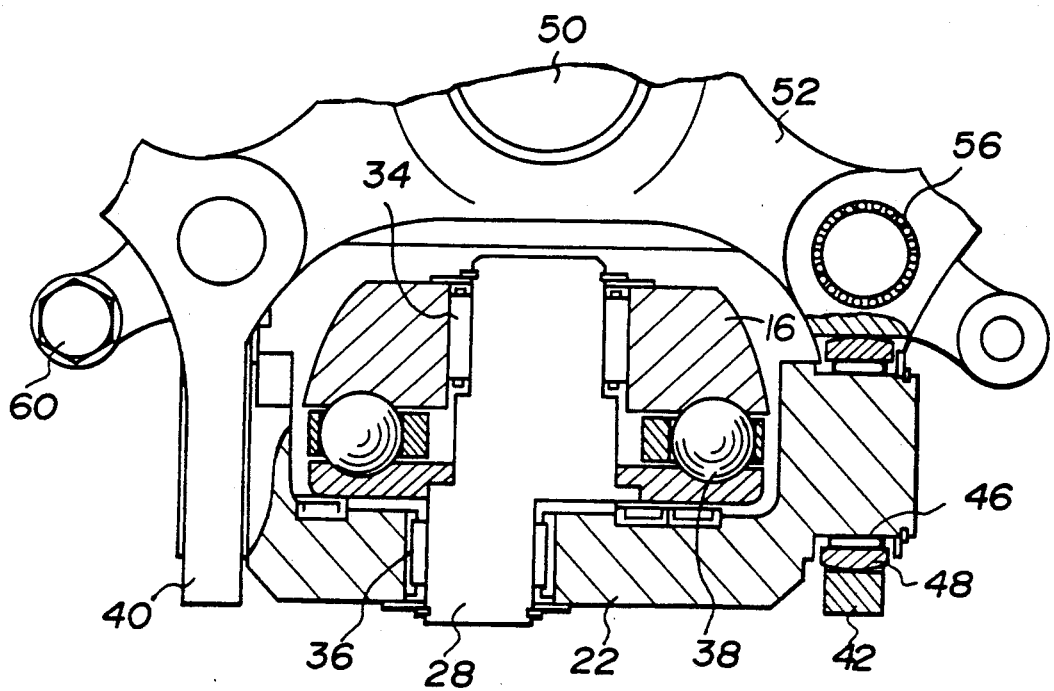
FIG. 3 is an enlarged fragmentary view of FIG. 1.

Referring to FIGS. 1 to 3, a first embodiment of a toroidal continuously variable transmission generally designed by a reference numeral 10 is described. As shown in FIG. 2, the transmission 10 includes co-axial input and output discs 12 and 14 having toric faces 12a and 14a. Each of the toric faces 12a and 14a is a half toroid surface of a ¼ circular arc. The input disc 12 receives a rotating motion from an engine of a motor vehicle, not shown.

Referring also to FIG. 1, in order to minimize roller loading and wear to increase the life of the rollers, three circumferentially-spaced friction rollers, namely, first, second and third friction rollers 16, 18, and 20, are disposed between and in driving contact with said toric surfaces 12a and 14a for transmitting a rotating motion or torque between the input and output discs 12 and 14. The rollers 16, 18, and 20 are rotatably supported in roller carriers 22, 24, and 26, respectively, by roller supporting shafts 28, 30, and 32. As best seen in FIG. 3, each of the roller supporting shafts, for example one being designated by the reference numeral 28, projects into a central bore formed through the associated friction roller 16 and has an exccentric portion projecting into a bore formed with the associated roller carrier 22. Needle bearings 34 are provided for radial support of the shaft 28, while needle bearing 36 are provided for raidial support of the eccentric portion of the shaft 28. Ball bearings 38 are provided to support the associated friction roller 16 against thrust radially outward along its shaft 28. Upon translation of each of the roller carriers 22, 24, and 26 in a circumferential direction of the input and output discs 12 and 14, this movement rotates the shafts 28, 30, and 32, tilting the roller carriers 22, 24, and 26, producing inclination of the rollers 16, 18, and 20 between the input and output discs 12 and 14.

For more understanding of the operation of the friction rollers, roller carrier and roller supporting shafts, reference should be made to U.S. Pat. No. 4,905,529 which has been hereby incoporated by reference in its entirety.

Referring to FIG. 1, there are three V-shaped swing links 40, 42, and 44 rotatably supported on a housing 58 (see FIG. 2) by shafts 54 of a link post 52 that is secured to the housing 58 by bolts 60. The link post 52 is has a central opening through which a disc supporting shaft 50 extends. Each of the V-shaped swing links 40, 42, and 44 has two arms diverging with an angle of 120°. As shown in FIG. 1, the two arms of the swing member 40 are associated with the trailing end of the first roller carrier 22 and the leading end of the third roller carrier 26, respectively. Similarly, the two arms of the second swing link 42 are associated with the leading end of the first roller carrier 22 and the trailing end of the second roller carrier 24, respectively, and the two arms of the swing link 44 are associated with the leading end of the second roller carrier 24 and the trailing end of the third roller carrier 26, respectively. As best seen in FIG. 3, the end portions of the roller carriers 22, 24, and 26 are received in bores formed through the adjacent arms of the associated swing links 40, 42, and 44.

Referring to FIG. 3, a spherical ring 48 is disposed between the leading end portion of the roller carrier 22 and the bore defining wall for forming a swivel connection between the arm of the carrier 42 and the associated roller carrier 22. Needle bearing 46 are disposed between the inner periphery of the spherical ring 48 and the end portion of the roller carrier 22 for permitting slidable movement of the roller carrier 22, thus forming a slidable connection between the arm of the swing link 42 and the associated roller carrier 22. The trailing end portion of the roller carrier 22 is received in the arm of the swing link 40 by a spherical ring and needle bearings in the same manner. The both ends of each of the other two swing links 24 and 26 are received in the associated arms of the adjacent two of the swing links 40, 42, and 44 by spherical rings and needle bearing in the same manner.

Referring to FIG. 1, the link post 52 has three diverging arms, each extending between the adjacent two of the friction rollers 16, 18, and 20 and having an end bifurcated as shown in FIG. 2. As is readily understood from FIG. 2. Each of the swing links 40, 42, and 44 are rotatably received between the bifuacated end of the associated one of the arms of the link post 52 by the associated shaft 54 bridging the bifurcated end. Bearings 56 are disposed between the shaft 54 and the associated one swing link 44. The bifurcated ends of the arms of the link post 52 have interposed therebetween the housing 58 and fixed thereto by the bolts 60 (see FIG. 2).

For controlling the roller carriers 22, 24, and 26, a hydraulic control system is provided. This control system comprises a source of hydraulic fluid 76a, a pump 76 for drawing in hydraulic fluid from the source 76a and generating the hydraulic fluid at a pressure, servo motors 62, 64, and 66 operatively connected the roller carriers 22, 24, and 26, respectively, a ratio change control valve 68 for controlling a pressure differential created within each of the servo motors 62, 64, and 66, and a stepper motor 70 for the control valve 68.

The control valve 68 includes a sleeve 72 drivingly connected to the stepper motor 70, and a spool 74 slidably received in the sleeve 72. For understanding the detailed structure of this ratio change control valve 68, reference should be made to the before mentioned patent (U.S. Pat. No. 4,905,529) since the same valve in disclosed therein. Briefly, the control valve has a first outlet port 68a connected to first servo chambers 62a, 64a, and 66a of the first, second, and third roller carriers 62, 64, and 66, respectively, a second outlet port 68b connected to second and opposite servo chambers 62b, 64b, and 66b of the first, second and third roller carriers 62, 64, and 66, an inlet port 68c connected to the pump 76 by a hydraulic pressure line which a pressure regulator valve 100 is connected to. With this pressure regulator valve 100, the hydraulic pressure applied to the inlet port 68c of the control valve 68 is regulated. The spool 74 has axially spaced two lands and the sleeve 72 is moveable by the stepper motor 70 relative to the spool 74 so that moving the sleeve 72 relative to the spool 74 varies a pressure defferential created between the associated first and second chambers of each of the roller carriers 62, 64, and 66. Owing to this variation, a magnitude of a servo force applied to each of the roller carriers 22, 24, and 26 by the associated one of the servo motors 62, 64, and 66 is varied.

The control system also includes a feedback system using a precess cam 78 attached to the servo motor 64 to feed back motion of the roller carrier 24 to the spool 74 of the ratio change control valve 68.

In the arrangement shown in FIG. 1, the first servo motor 62 is connected to the trailing end of the first roller carrier 22 by its piston rod, the second servo motor 64 to the trailing end of the second roller carrier 24 by its piston rod, and the third servo motor 66 to the leading end of the third roller carrier 26 by its piston rod. In this case, in order to allow intersection between the pistons rods of the first and third servo motors 62 and 66 without any interference, the piston rod of the first servo 62 includes an intermediate portion formed with an opening 62c which allows the piston rod of the third servo motor 66 to extend through.

A ratio chage is initiated by movement of the sleeve 72 relative to the spool 74. Viewing in FIG. 1, moving the sleeve 72 to the right relative to the spool 74 causes an increase in hydraulic pressure within each of the first servo chamber 62a, 64a, and 66a of the associated roller carriers 62, 64, and 66 and a drop in hydraulic pressure within each of the second servo chambers 62b, 64b, and 66b. This produces servo forces urging the roller carriers 22, 24, and 26 in such directions as to tilt the V-shaped swing members 62, 64, and 66 clockwise. This produces a roller inclination of each of the rollers 16, 18, and 20 to arrive at a new reduction ratio position larger than an initial position. This motion of the roller carrier 24 is transmitted to the precess cam 78 via the piston rod of the servo motor 64. The piston rod of the servo motor moves longitudinally and turns together with the precess cam 78 during the above-mentioned motion of the roller carrier 24. Each of the piston rods is connected to the associated piston in such a manner as not to transmit turning motion to the associated piston. Owing to this cam 78 and an appropriate link, the motion (precession) of the roller carrier 24 is translated into a linear motion of the spool 72. The structure including the cam 78 and the associated link is substantially the same as the precess cam and the associated motion transmitting link shown in U.S. Pat. No. 4,905,529. The roller inclination is reduced to zero when the new ratio position is arrived at.

Moving the sleeve 72 from the illustrated balanced state to the left relative to the spool 74 causes a drop in hydraulic pressure within each of the first servo chamber 62a, 64a, and 66a of the associated roller carriers 62, 64, and 66 and an increase in hydraulic pressure within each of the second servo chambers 62b, 64b, and 66b. This produces servo forces urging the roller carriers 22, 24, and 26 in such directions as to tilt the V-shaped swing links 62, 64, and 66 counterclockwise, viewing in FIG. 1. This produces a roller inclination of each of the rollers 16, 18, and 20 to arrive at a new reduction ratio position smaller an initial position. The roller inclination is reduced to zero when the new ratio position is arrived at.

At least three rollers 22, 24, and 26 are arranged in a spaced-circumferential manner between the input and output discs 12 and 14. This is advantageous as compared with the arrangement with two rollers between input and output dics in that a larger torque is transmitted between the input and output discs.

As seen in FIG. 2, the input and output sics 12 and 14 have half troidal surfaces 12a and 14a, and thus reduced radial dimensions. Thus, the inertia of rotation which the input and output discs 12 and 14 are subject to is decreased.

The servo motors 62, 64, and 66 directly urge the associated roller carriers 22, 24, and 22, respectively, to tilt the V-shaped swing links 40, 42, and 44. This arrangement can compensate for manufacturing and machining tolerances at portions where each of the arms of the swing links 40, 42, and 44 supports the associated roller carrier. Thus, a degree of accuracy required at such portions is lowered.

Reaction forces applied to the rollers 16, 18, and 20 by the input and output discs 12 and 14 are explained. Referring to FIG. 1, a thrust force applied to each of the rollers 16, 18, and 20 is represented by the character f. The thrust force f on each of the rollers 16, 18, and 20 is beared by those arms of the adjacent two swing links 40, 42, and 44 which supports the associated roller carrier. Thus, the magnitude of force applied to each of the arms of one of the swing links 40, 42, and 44 can be expressed by $\frac{1}{2} \times f$, i.e., one half of the thrust force f. Therefore, each of the swing links 40, 42, and 44 is subject to a resultant force, f, having a magnitude expressed as $\frac{1}{2} \times f$ and directed radially outward since the arms of each of the swing links form the angle of 120°. These three radially outwardly directed forces applied to the swing members 40, 42, and 44 are beared by the link post 52 and balanced to produce any force on the link post 52.

Figure 4:
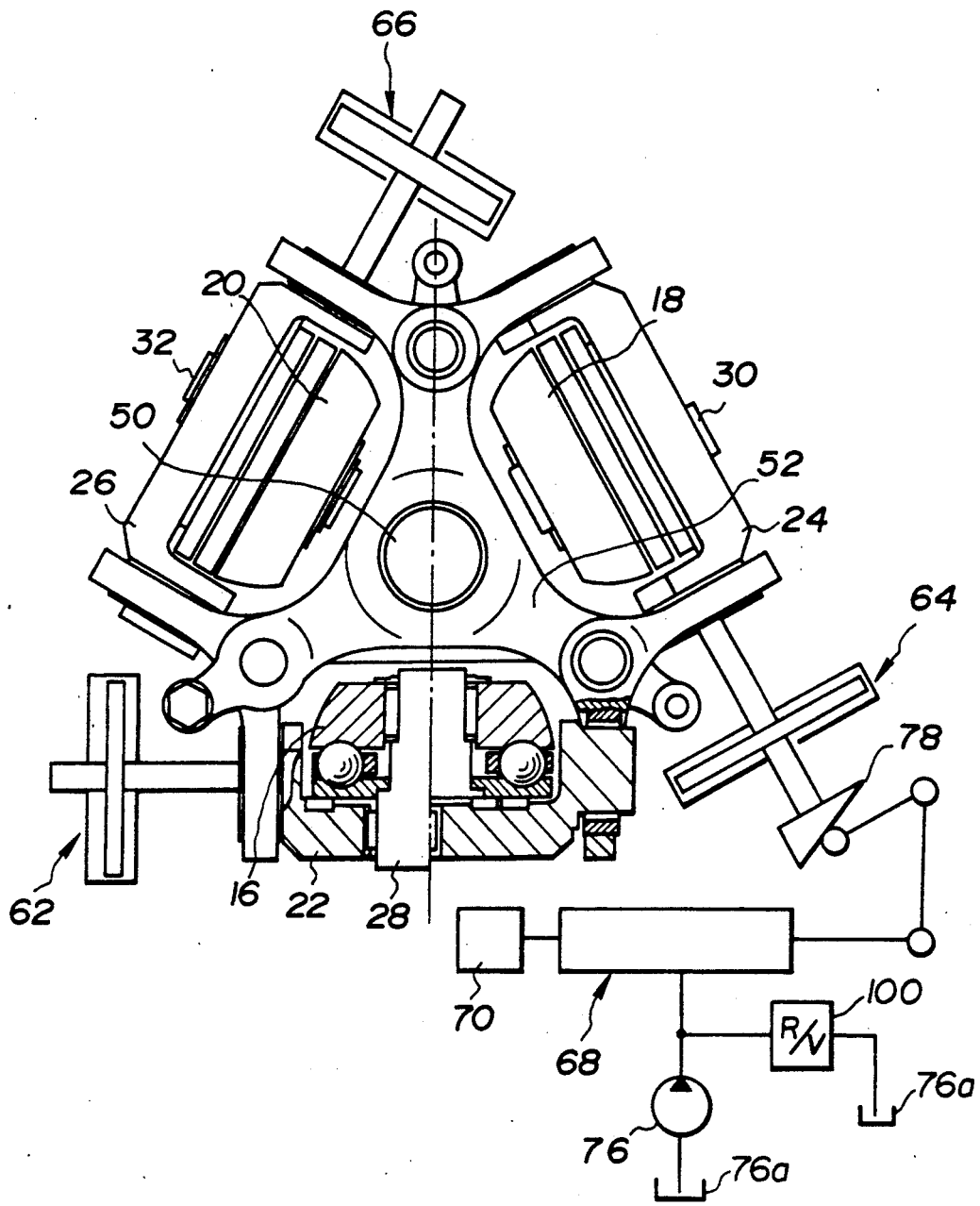
FIG. 4 is a similar view to FIG. 1, but illustrating a second embodiment.
Figure 5:
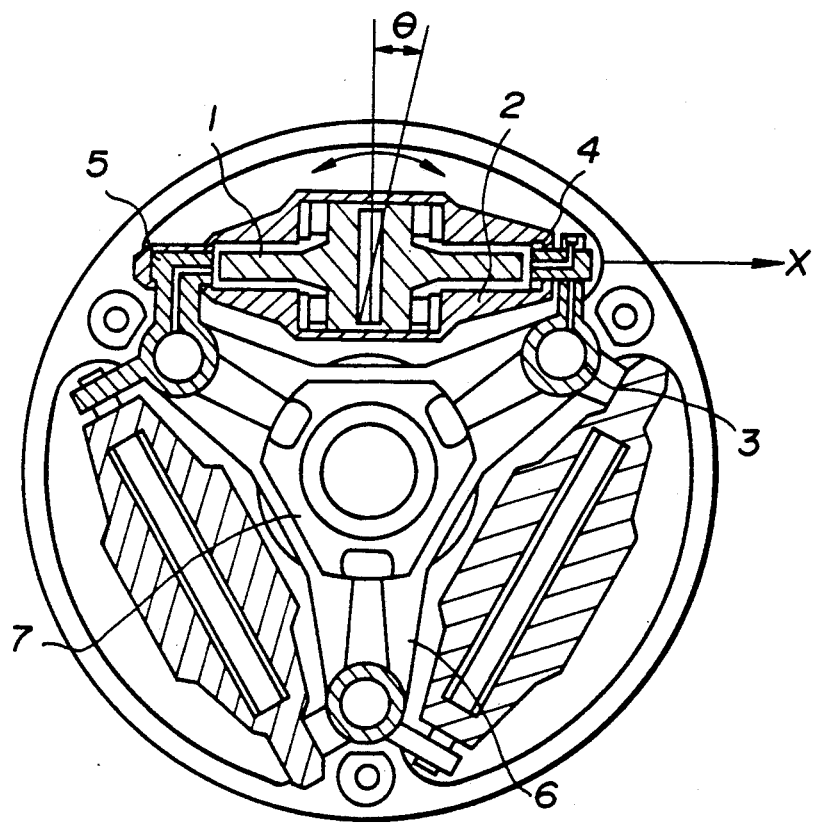
FIG. 5 is a sectional diagrammatic view of a known continuously variable transmission previously discussed.

FIG. 4 shows a second embodiment according to the present invention. This embodiment is substantially the same as the previously described first embodiment except that a servo motor 66 associated with a third roller carrier 26 is connected to its trailing end rather than its leading end. This is advantageous in that it is no more necessary to provide the intermediate portion formed with the opening 62c for allowing exctension of the piston rod of the servo motor 66 (see FIG. 1).

In the illustrated embodiments, three friction rollers are disposed between input and output discs, the number of the roller is not limited to three. It is not the intention of the present invention to limit this number to three. The number of the rollers may be four or more than four.

What is claimed is:

1. In a toroidal continuously variable transmission:
co-axial input and output discs having facing toric surfaces;
at least three circumferentially-spaced friction rollers disposed between and in driving contact with said toric surfaces for transmitting torque between said input and output discs;
roller carriers rotatably supporting said rollers, respectively;
swing links, each of said swing links having two arms, each of said arms being associated with one of said carriers;
means for forming a swivel connection between each of said arms and its associated carrier;
means for forming a slidable connection between each of said arms and its associated carrier; and
control means for controlling said roller carriers.

2. A toroidal continuously variable transmission as claimed in claim 1, wherein each of said toric surfaces is a half toroid.

3. A toroidal continuously variable transmission as claimed in claim 1, wherein said control means include servo motors operatively connected to said roller carriers, respectively; a source of hydraluic fluid; pump means for drawing in the hydraulic fluid from said source of hydraulic fluid and generating the hydraulic fluid at a pressure; control valve means for controlling a pressure differential created within each of said servo motors for inducing motion of its associated roller carrier; means including an actuator for activating said control valve means; and feedback means for appling a force to said control valve means in response to said motion of one of said roller carriers.

4. A toroidal continuously variable transmission as claimed in claim 1, wherein said pivot forming means include a bore with which its associated arm is formed, a spherical ring received in said bore and coupled to its associated roller carrier.

5. A toroidal continuously variable transmission as claimed in claim 4, wherein said slidable movement forming means include a needle bearing disposed between said spherical ring of its associated pivot forming means and its associated roller carrier for permitting a limited motion of said associated roller carrier in a longitudinal axis thereof.

6. A toroidal continuously variable transmission as claimed in claim 1, wherein said at least three circumferentially-spaced friction rollers consist of first, second, and third friction rollers, and said roller carriers consist of first, second, and third roller carriers rotatably supporting said first, second, and third rollers, respectively.

7. A toroidal continuously variable transmission as claimed in claim 6, wherein said control means include first, second, and third servo motors, said first servo motor being operatively connected to said first roller carrier at a leading end thereof with respect to the circumferenmtial direction, said second and third servo motors being operatively connected to said second and third roller carriers at their trailing ends with respect to the circumferential direction, respectively, a source of hydraluic fluid; pump means for drawing in the hydraulic fluid from said source of hydraulic fluid and generating the hydraulic fluid at a pressure; control valve means for controlling a pressure differential created within each of said servo motors for inducing motion of its associated roller carrier; means including an actuator for activating said control valve means; and feedback means for applying a force to said control valve means in response to the motion of said roller carrier.

8. A toroidal continuously variable transmission as claimed in claim 3, wherein said control means include first, second, and third servo motors, said first, second, and third servo motors being operatively connected to said, first, second and third roller carriers at their trailing ends with respect to the circumferential direction, respectively.

* * * * *